United States Patent [19]

Bonnet

[11] Patent Number: 5,894,918
[45] Date of Patent: Apr. 20, 1999

[54] CONVEYOR HAVING SERPENTINE CAPABILITIES

[75] Inventor: Henri Bonnet, Atlanta, Ga.

[73] Assignee: United Parcel Service of America, Inc., Atlanta, Ga.

[21] Appl. No.: 08/779,301

[22] Filed: Jan. 6, 1997

[51] Int. Cl.⁶ .............. B65G 47/46; B65G 15/34; B65G 23/14; B65G 23/04
[52] U.S. Cl. .............. 198/370.04; 198/847; 198/370.02; 198/833; 198/835
[58] Field of Search .............. 198/847, 370.02, 198/370.04, 833, 835

[56] References Cited

U.S. PATENT DOCUMENTS

| 2,286,332 | 6/1942 | Bleyer . | |
|---|---|---|---|
| 2,293,121 | 8/1942 | Dudley . | |
| 2,446,890 | 8/1948 | Stadelman | 198/833 |
| 2,884,118 | 4/1959 | Williams . | |
| 3,026,988 | 3/1962 | Fisk . | |
| 3,202,266 | 8/1965 | Schmermund . | |
| 3,262,549 | 7/1966 | Stewart et al. . | |
| 3,262,550 | 7/1966 | Kampfer . | |
| 3,270,863 | 9/1966 | Ackles . | |
| 3,310,161 | 3/1967 | Kraft | 198/847 |
| 3,348,678 | 10/1967 | Flowers . | |
| 3,349,893 | 10/1967 | Jordan et al. . | |
| 3,481,807 | 12/1969 | Kanamori . | |
| 3,511,357 | 5/1970 | Vanderhoof . | |
| 3,682,295 | 8/1972 | Roinestad . | |
| 3,756,380 | 9/1973 | Ackroyd et al. . | |
| 3,776,349 | 12/1973 | Kampfer . | |
| 3,777,877 | 12/1973 | Piper . | |
| 3,788,447 | 1/1974 | Stephanoff . | |
| 3,838,767 | 10/1974 | Taylor | 198/833 |
| 3,865,229 | 2/1975 | Velander | 198/847 |
| 3,889,803 | 6/1975 | White | 198/833 |
| 3,904,028 | 9/1975 | Muller . | |
| 3,944,044 | 3/1976 | Hamy | 198/833 |
| 3,976,192 | 8/1976 | Muller . | |
| 4,024,949 | 5/1977 | Kleysteuber et al. | 198/835 |
| 4,067,439 | 1/1978 | Janitsch | 198/835 |
| 4,078,654 | 3/1978 | Sarovich . | |
| 4,084,687 | 4/1978 | Lapeyre . | |
| 4,128,163 | 12/1978 | Rana et al. | 198/370.02 |
| 4,170,281 | 10/1979 | Lapeyre . | |
| 4,185,737 | 1/1980 | Blattermann . | |
| 4,227,610 | 10/1980 | Gerdes et al. . | |
| 4,295,559 | 10/1981 | Neal et al. . | |
| 4,537,658 | 8/1985 | Albert . | |
| 4,637,511 | 1/1987 | Johnson et al. | 198/846 |
| 4,682,686 | 7/1987 | Ueda et al. . | |
| 4,712,965 | 12/1987 | Canziani . | |
| 4,732,260 | 3/1988 | Canziani . | |
| 4,770,290 | 9/1988 | Eroskey et al. | 198/847 |
| 4,776,454 | 10/1988 | Momose . | |
| 4,875,573 | 10/1989 | Wiseman . | |
| 5,127,510 | 7/1992 | Cotter et al. . | |
| 5,176,247 | 1/1993 | Counter et al. . | |
| 5,288,194 | 2/1994 | Ueda et al. . | |
| 5,388,681 | 2/1995 | Bonnet . | |
| 5,421,446 | 6/1995 | Koch et al. . | |
| 5,422,165 | 6/1995 | Arnold | 198/192 |
| 5,433,311 | 7/1995 | Bonnet . | |
| 5,456,349 | 10/1995 | Axmann . | |

FOREIGN PATENT DOCUMENTS

| 2088498 | 1/1972 | France . | |
|---|---|---|---|
| 352226 | 4/1922 | Germany . | |
| 4033425 | 4/1992 | Germany | 198/835 |
| 4443207 A | 6/1995 | Germany . | |
| 2-221007 | 9/1990 | Japan . | |
| 3-95009 | 4/1991 | Japan . | |
| 1316954 | 6/1987 | U.S.S.R. . | |
| 1514708 | 10/1989 | U.S.S.R. . | |
| 1 045 348 | 10/1966 | United Kingdom . | |

*Primary Examiner*—Karen M. Young
*Assistant Examiner*—Steven B. McAllister
*Attorney, Agent, or Firm*—Jones & Askew

[57] ABSTRACT

An automated conveyor sortation and item discharge system for sorting items of varying sizes and weights to designated output destinations along a conveyor. A serpentine configuration is provided by use of a continuous notched conveyor belt layer, which can have no discharge capabilities, or can include 26 Claims, 9 Drawing Sheets

5,894,918

CONVEYOR HAVING SERPENTINE CAPABILITIES

TECHNICAL FIELD

This invention relates generally to automated conveying and sorting of items such as packages from one or more loading sites to a variety of output destinations, and more particularly relates to a conveying system which can convey packages along a curved or serpentine path and eject them from said path.

BACKGROUND OF THE INVENTION

Modern high volume package delivery systems often include package conveying systems that accept packages from one or more loading stations, and transports the packages to a variety of output destinations such as chutes, bins, and subsequent conveyor systems.

One of the most conventional types of conveyors is a belt conveyor, which includes the use of an endless flexible belt which passes over at least two cylindrical rollers, one of which is a drive roller. Packages are placed atop the upwardly-directed "working" surface of the belt conveyor, and are transported in a generally straight direction from end of the conveyor to the other.

Although such conventional belt conveyors have advantages, including simplicity, they also have disadvantages in that they conventionally only provide a "straight-line" transporting feature. This can be restrictive to package delivery system designers who may have the need to move a package or other product from an origin through a tortuous, curved, path to a destination.

Therefore, it has been known in the prior art to provide flexible conveyor chains such as shown in U.S. Pat. No. 3,776,349 to Kampfer, entitled "Fabricated Conveyor Chain", which discloses the concept of providing a fabricated flexible conveyor chain, which includes a plurality of link units 11 linked together by a plurality of pivot pins 12. Although the pivot pins 12 provide a linking feature between the link units, they fit loosely enough within their mounting holes to allow sideward relative pivoting of the link units. A similar type of "hard pin" connection is disclosed in U.S. Pat. No. 3,262,550 to Kampfer, entitled "Conveyor Chain", in U.S. Pat. No. 2,884,118 to Williams, entitled "Articulator Conveyor Chain", and also in U.S. Pat. No. 5,176,247 to Counter et. al., entitled "Sideflexing Conveyor Chain including Low Centerline Hinge Pin".

Although such "hard pin" connection configurations as described above have their advantages, they have disadvantages in that they tend to be complex, expensive, noisy, and difficult to maintain. Furthermore, they tend to provide a multitude of hard "pinch points", which are disadvantageous when in a human workplace environment. A "smooth" but flexible conveyor configuration is disclosed in U.S. Pat. No. 4,084,687 to Lapeyre, entitled "Conveyor Having Resilient Conveying Surface", but this configuration appears to be quite complex, requiring the use of link members 20 which are linked to modules 20 to support and convey flexible members 32 supported thereon.

Therefore, there is a need in the art to provide a package conveyor system which can transport packages or other items along a tortuous path, yet is simple in construction, quiet in operation, and cost-effective to manufacture, operate, and maintain.

SUMMARY OF THE INVENTION

The present invention provides an improved conveyor sorting system which has serpentine capabilities, yet is simple in construction, quiet in operation, and cost-effective to manufacture, operate, and maintain.

Generally described, one aspect of the present invention provides a conveyor comprising a plurality of conveying segments each defining one of a plurality of conveying surfaces, means for driving the conveyor segments along a variably curved path such that the conveyor segments pivot sidewardly relative to each other while traveling along the variably curved path, and a plurality of flexible neck portions interconnecting the conveyor segments while accommodating sideward pivoting.

Another aspect of the present invention includes providing a conveyor comprising a plurality of conveyor segments each defining one of a plurality of conveying surfaces each of the conveyor segments defining opposing discrete, side edges. Under this aspect of the invention a plurality of flexible necked portions are intermediate and connecting each of the plurality of conveyor segments, the intermediate necked portions each defining two opposing side notches which reduce the width of the necked portions to accommodate side flexing of the necked portions conveyor segments relative to each other such that the side notches open and close with said flexing. This aspect of the present invention also includes edge segments drive means for driving the conveyor along the path by contacting the discrete side edges, such that the segmented conveyor is driven along the curved path at least partially under the power of the edge drive means.

Thus, it is an object of the present invention to provide an improved automated conveyor sorting system.

Thus, it is an object of the present invention to provide an improved conveyor system which includes serpentine path capabilities.

It is a further object of the present invention to provide a conveyor which is simple in construction.

It is a further object of the present invention to provide a conveyor which includes a arcuate conveying path.

It is a further object of the present invention to provide a conveyor which can be driven by its edge and does not require drive drums.

It is a further object of the present invention to provide a conveyor which is simple in operation.

It is a further object of the present invention to provide a conveyor which is cost-effective to manufacture, operate, and maintain.

It is a further object of the present invention to provide an improved conveyor which may be easily dismantled for repair and maintenance.

It is a further object of the present invention to provide a conveyor which operates at reduced noise levels.

It is a further object of the present invention to provide an improved ejection mechanism for ejecting items from a conveying surface.

Other objects, features, and advantages of the present invention will become apparent upon review of the following description of preferred embodiments and the appended drawings and claims.

DETAILED DESCRIPTION

Reference is now made in more detail to the drawings, in which like numerals refer to like parts throughout the several views.

General Discussion

Figure 1:
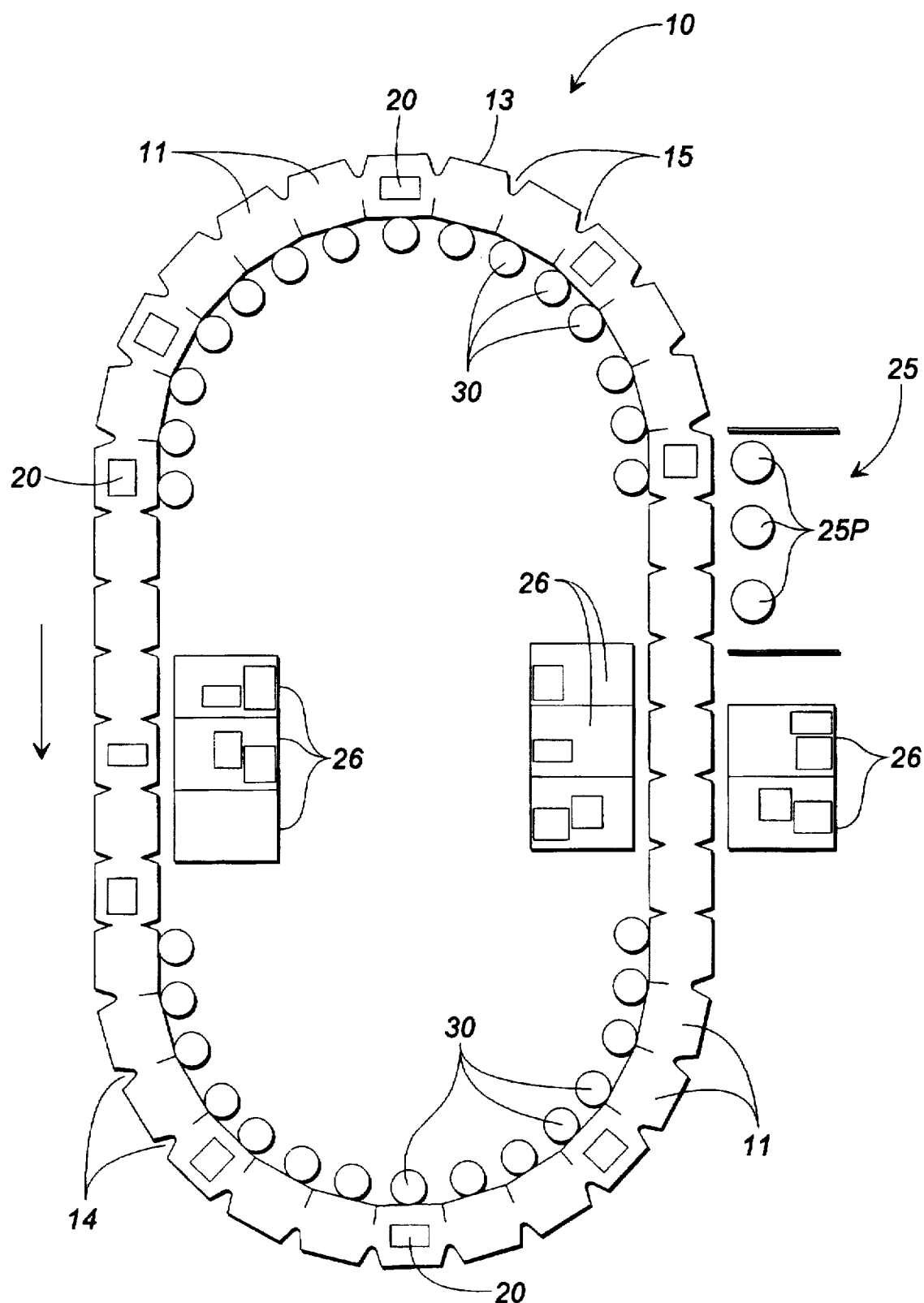
FIG. 1 is a top overhead view of a first layout of an overall conveyor system 10 according to the present invention, which is essentially an endless conveyor having two "semi-circle" portions and two straight-line portions.

General operation of the conveyor apparatus 10 according to the present invention is as follows. Referring first to FIG. 1, the conveyor apparatus 10 according to the present invention includes a plurality of conveying segments 11 which are attached together by flexible necked portions 14 (see FIG. 4), which allow the conveying segments 11 to pivot sidewardly relative to each other. This relative pivoting capability allows the conveying segments 11 to be moved along a curved or even serpentine path such as shown as 19 in FIG. 2. The conveying segments 11 are configured to support (either directly or indirectly as discussed in detail below) packages 20 or other items, thus allowing the conveyor system 10 to likewise move the packages along a curved or serpentine path and eject them therefrom.

The package conveying segments generally denoted as 11 of the serpentine conveyor system 10 can take different particular configurations. In the case of FIGS. 3–7, a tilt tray package conveying segment 50 including trays such as 51 supported by vertical bellows members 54 can be used such that a package placed atop the tray slides off at least partly under the influence of gravity upon selective tilting of the tray by the bellows.

FIGS. 11–19 illustrate another type of package conveying segment, a "push plate" conveying segment 100, in which two or more horizontally-acting bellows members are attached relative to the top surface of the base 102 of the push plate conveying segment 100, to provide a pushing function to a package situated atop, the top surface of the base 102, such that it slides off the base 102.

The conveyor system 10 can also include the use of side-urging pulleys 30 (see FIGS. 1, 3 and 5) or a belt 70 (see FIGS. 8–10), to grip and drive the discrete side edges of the package conveying segments. As these side edges 13 are spaced apart by notches, and if pulleys 30 are used, the position of the pulleys can be on the "inside" of the path curve, where the notches tend to be substantially or completely closed. If a belt is used, it is not as critical that the notches be closed. In fact, the belt can be used on the inside of the path curve, or can also be used along a straight portion of the curve.

It may be well understood that this serpentine capability provides a marked advantage for conveyor system designers, as it does not restrict them to the use of straight conveying paths. It also allows for the use of a "carousel"— type conveying system which can provide a continuous support loop for the support and conveyance of packages, effectively allowing for packages to remain on the conveyor over more than one of its process cycles. This is to be distinguished from "over-under" conveying systems in which the conveyor is facing upwardly (and can be used) half the time, but is facing downwardly (and cannot be used) the other half of the time. Typically in such a configuration, drive and idler rollers having substantially horizontal axis are used to support and drive the conveyor.

More Particular Discussion

Figure 2:
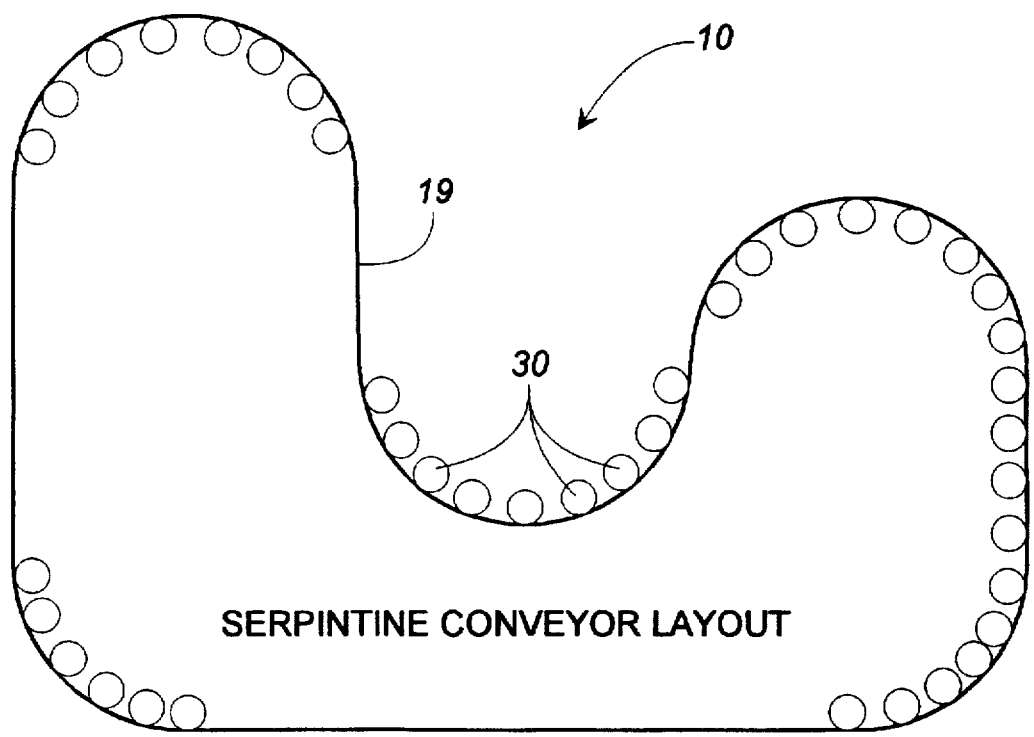
FIG. 2 is a top plan view of a second layout of an overall conveyor system 10 according to the present invention in including a serpentine conveying path 19.

A. The General Layouts (FIGS. 1–2)

As shown in FIG. 1, the conveyor apparatus 10 according to the present invention includes a plurality of conveying segments 11 which are attached together by flexible necked portions 14 (see FIG. 4), which allow the conveying segments 11 to pivot sidewardly relative to each other. This relative pivoting capability allows the conveying segments 11 to be moved along an oval-shaped path having curves and straight portions as shown in FIG. 1, and also allows them to move along a serpentine path shown as 19 in FIG. 2. The conveying segments 11 are configured to support (either directly or indirectly as discussed in further detail below) packages 20 or other items, thus allowing the conveyor system 10 to likewise move the packages along a curved or serpentine path. In the preferred embodiment, the conveying segments 11 and the flexible necked portions 14 are all part of the same flexible conveyor belt, although other separate configurations are also contemplated.

As shown in FIG. 1, the path of the package conveying segments can be oval-shaped, and pass along side various destination chutes such as 26. Within a loading station 25, packages may be placed upon the package conveying segments 11, from loading positions 25P. These loading positions 25P can be occupied by human operators hand-placing packages atop the package conveying segments, or could alternately be mechanical means as known in the art.

The flexible necked portions are an important part of the present invention. As shown in FIG. 1, the package conveying segments 11 may travel along a path which includes straight portions as well as curves, requiring the package conveying segments 11 to pivot sidewardly relatively to each other when making the transition from the curved portion to the straight portion, or vice versa. The notches 15 present in the flexible neck portions 16 provide clearance to facilitate such sideward flexing.

Figure 4:
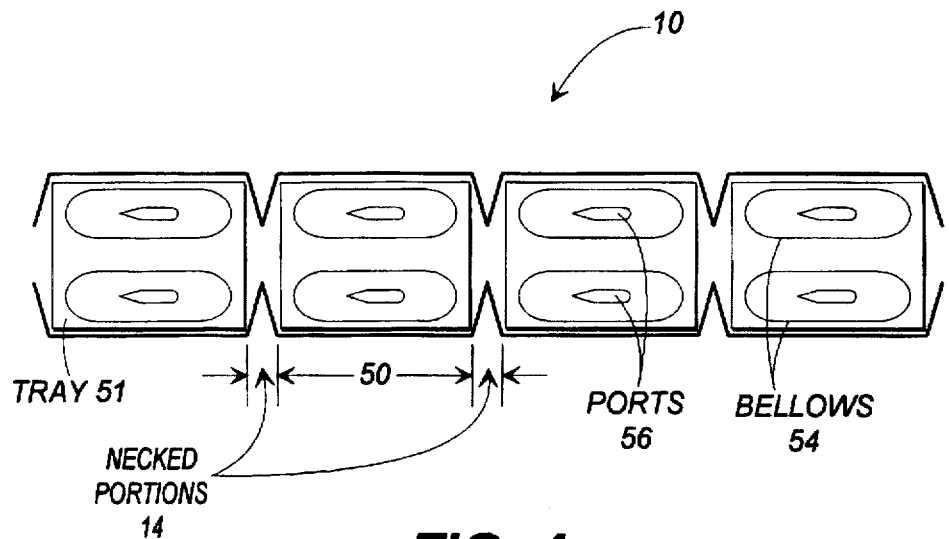
FIG. 4 is a top plan view of a straight section of a conveyor system 10 according to the present invention including a plurality of tilt tray package conveying segments 50 and a plurality of necked portions 14.
Figure 5:
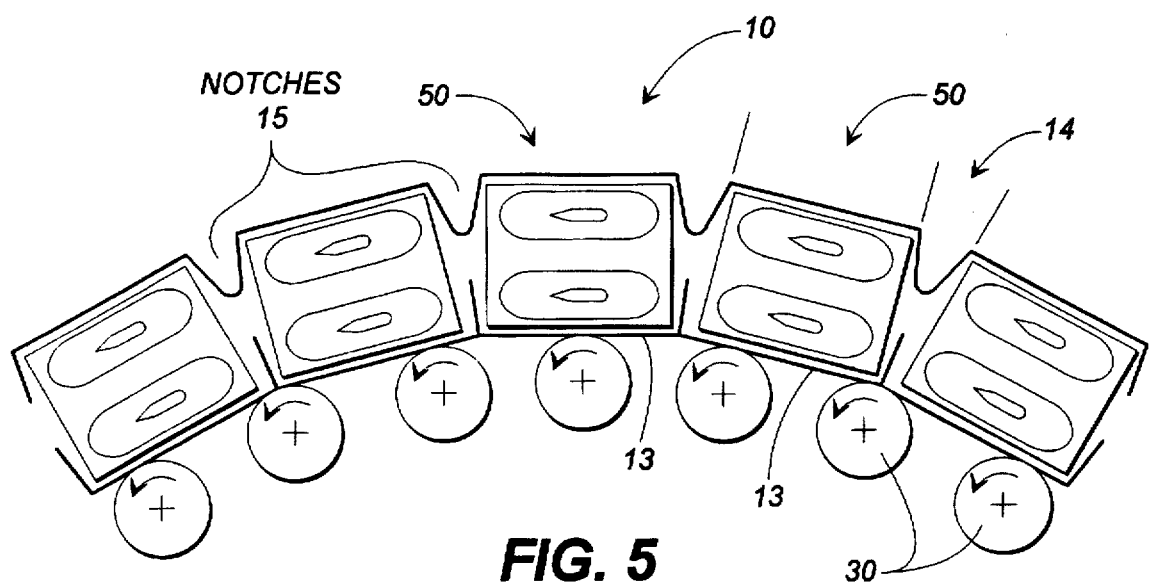
FIG. 5 is a top plan view of a curved section of a conveyor system according to the present invention including a plurality of tilt tray package conveying segments 50, illustrating the interaction of the curved section with edge drive pulleys positioned on the "inside"? of the curve along which the segments are traveling.

Reference is now also made to FIGS. 4 and 5, which are more detailed similar top plan views of the conveyor according to the present invention, illustrating a particular type of package conveying segment 50 used with the flexible necked portions 14.

FIG. 4 shows a "straight-line" length of the conveyor 10, that is, the shape the conveyor takes when passing along a straight line path. In such a configuration, the notches 15 in the flexible necked portions 14 are effectively the same shape regardless of which side they are on.

FIG. 5 illustrates the shape of the conveyor length as it passes around a curve. As may be seen in FIG. 5, the "inside" notches in the conveyor belt tend to be almost or completely closed, thus accommodating the pivoting action. Similarly, the "outside" notches tend to be more open, with flexing occurring along the flexible necked portion 14.

Figure 6:
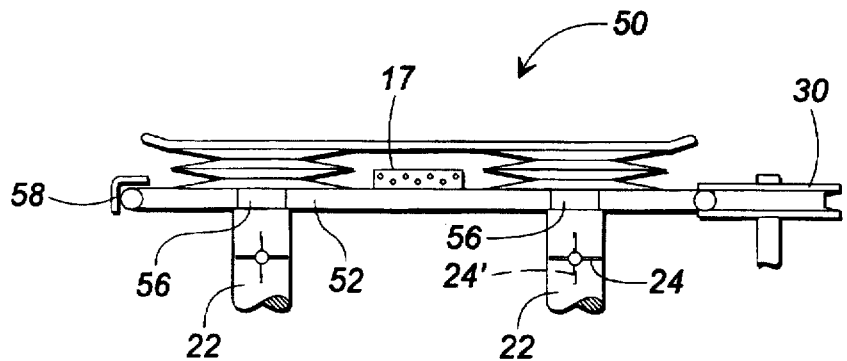
FIG. 6 is a cross-sectional view of a tilt tray package conveying segment 50, illustrating the interaction of same with air supply ports 22 and with an adjacent edge drive pulley 30.

As may well be understood, the flexible necked portions of the conveyor system can undergo a high degree of stress over their lifetimes, due to the fact that they are being repeatedly flexed while making turn transitions, as well as the fact that their reduced configurations require their narrowest cross section to not only flex but to carry a significant load. Therefore, it has been deemed preferable to include additional reinforcement in the form of KEVLAR or steel reinforcements as shown in FIG. 6. As shown in FIG. 6, an elongate reinforcement strip 17 can be attached (by gluing or other suitable means) to one side of the notched but otherwise conventional conveyor belt, such that the reinforcement strip provides additional reinforcement at the center of the belt, which will be the portion that will be doing the flexing as well as carrying any tensile or compressive load. FIG. 6 likewise illustrates an outer edge restraint 58, and a powered edge pulley 30, which will be discussed later in further detail.

The Edge Gripping Pulleys(FIGS. 3, 5–7)

As noted above, and referring generally to FIGS. 3, 5–7, the conveyor system 10 can include the use of edge drive pulleys 30, to grip the discrete side edges of the package conveying segments to cause the conveyor to move along its path. As these side edges 13 are spaced apart by notches 15, and if pulleys 30 are used, the position of the pulleys can be on the "inside" of the path curve, where the notches tend to be substantially or completely closed. This is advantageous in that the partial or complete closing of the gaps provided by the notches can provide a substantially or completely continuous edge which is "seen" by the edge drive pulleys 30. In the configuration shown in FIGS. 1 and 5, the notches are completely closed, such that a continuous edge is "seen" by the driving pulleys. In the configuration shown in FIG. 10, the notches are not completely closed.

In one embodiment of the present invention such as shown in FIG. 1, the side edge of the conveying segments 11 are not straight, instead they are slightly "cupped" inwardly such that a semicircle of substantially constant radius is defined by the inner edges of the conveying segments as they go around each half turn. This provides a substantially consistent edge for the pulleys 30 to drive. However, the pulleys 30 can be spring-loaded to accommodate slight variations due to tolerances and wear.

In one preferred embodiment, the notches define a seven degree (7°) angle, the reinforcement strip is approximately 1.5 inches in width, and the lateral spacing of the peaks of the notches is likewise 1.5 inches. The notches are sixteen (16) inches on center and a 20 foot turn radius is accommodated with full closure of the inside notches. The reinforcement strip is a conventional steel or KEVLAR reinforced belt.

In the configuration shown in FIG. 1, these edge drive pulleys 30 are located inside the conveying path, along the inside edge of the belt path as shown in FIG. 1. However, in reference to FIG. 2, it may be seen that the edge drive pulleys 30 can also be located outside of the conveyor path, but at the same time being on the inside of a particular conveyor path curve.

Figure 7:
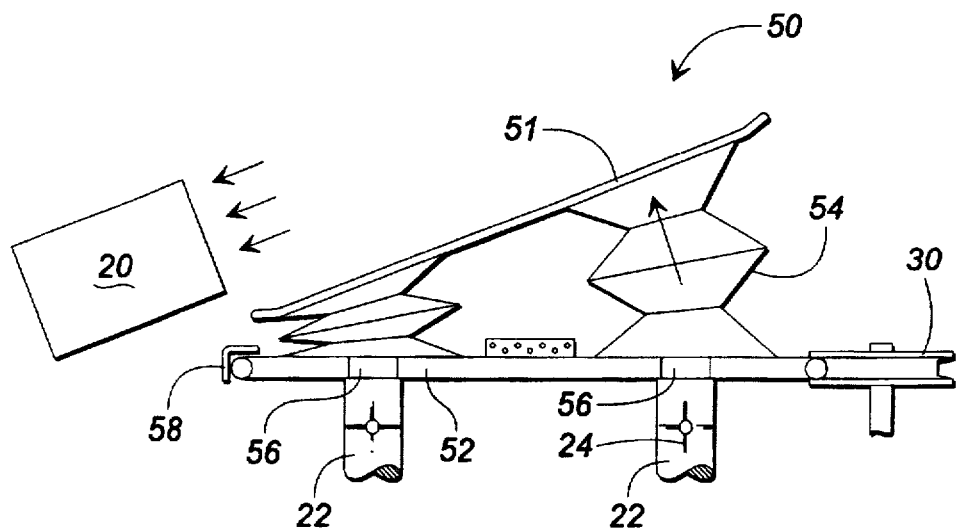
FIG. 7 is a view similar to that off FIG. 6, except that one of the two bellows is shown expanded due to the introduction of air therein.
Figure 11:
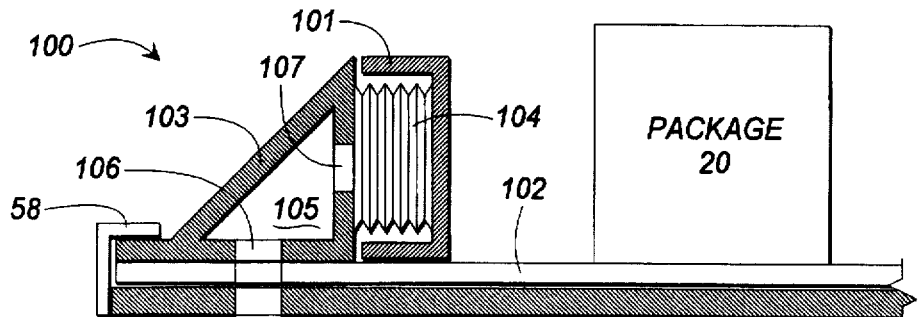
FIG. 11 is a side elevational view of a "push plate" package conveying segment, shown in its retracted mode.
Figure 11:
Figure 12:
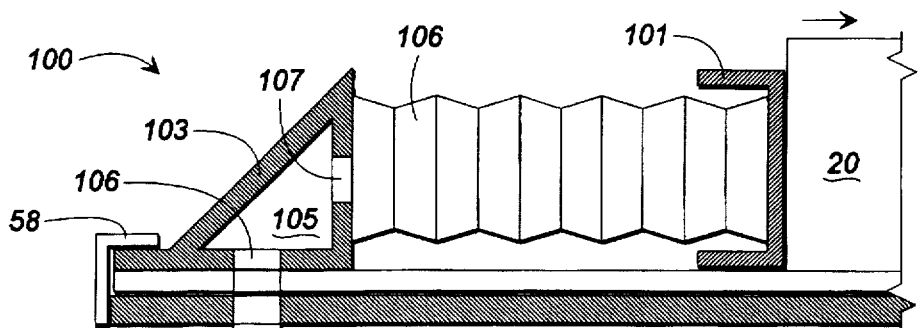
FIG. 12 is a side elevational view of the "push plate" package conveying segment 100 of FIG. 11, shown in its extended mode.
Figure 12:
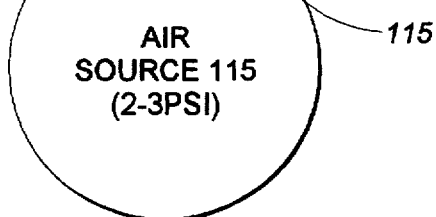

FIGS. 5, 6, and 7, an edge restraint 58 is provided on the outside of the curved path, in order to laterally restrain movement of the conveying segments as they are urged by the edge pulleys. The package conveying segments are therefore captured between the edge pulleys 30 and the outer restraint 58, and moved therebetween by the force of the edge pulleys 30. However, it may of course be understood that outer edge restraints such as 58 could be used at many different locations along the conveyor belt path, not only to provide the above-referenced capturing feature, but also as shown in FIG. 11 to provide a retaining function which may be needed to counter a sideward force imparted to the belt during a dynamic pushing function discussed later in this application. Finally, edge restraints such as 58 can be used along belt portions that may need some guidance for other reasons. For example, it could be necessary to use two cooperating, inwardly-directed edge restraints 58 to encourage belt alignment at a particular location along its path.

Figure 8:
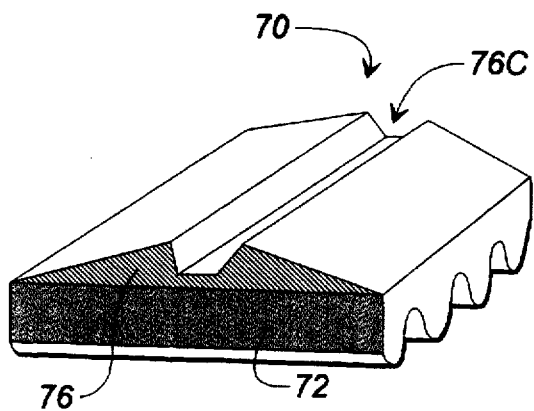
FIG. 8 is an pictorial view of an isolated section of cogged belt 70 according to the present invention.
Figure 9:
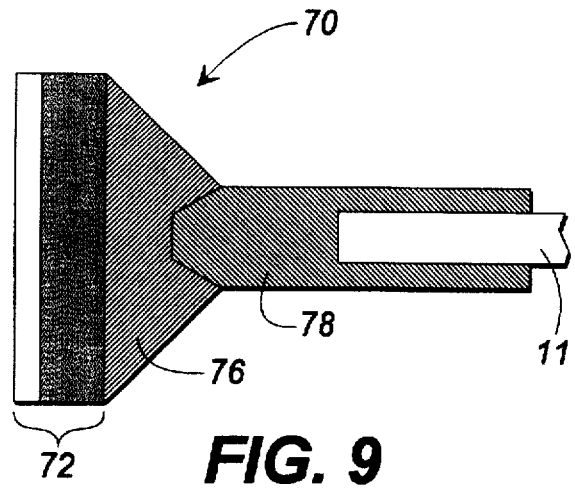
FIG. 9 is a side plan view of an isolated section of cogged belt 70 according to the present invention in engagement with a built-up edge portion of a conveying segment generally denoted as 78.
Figure 10:
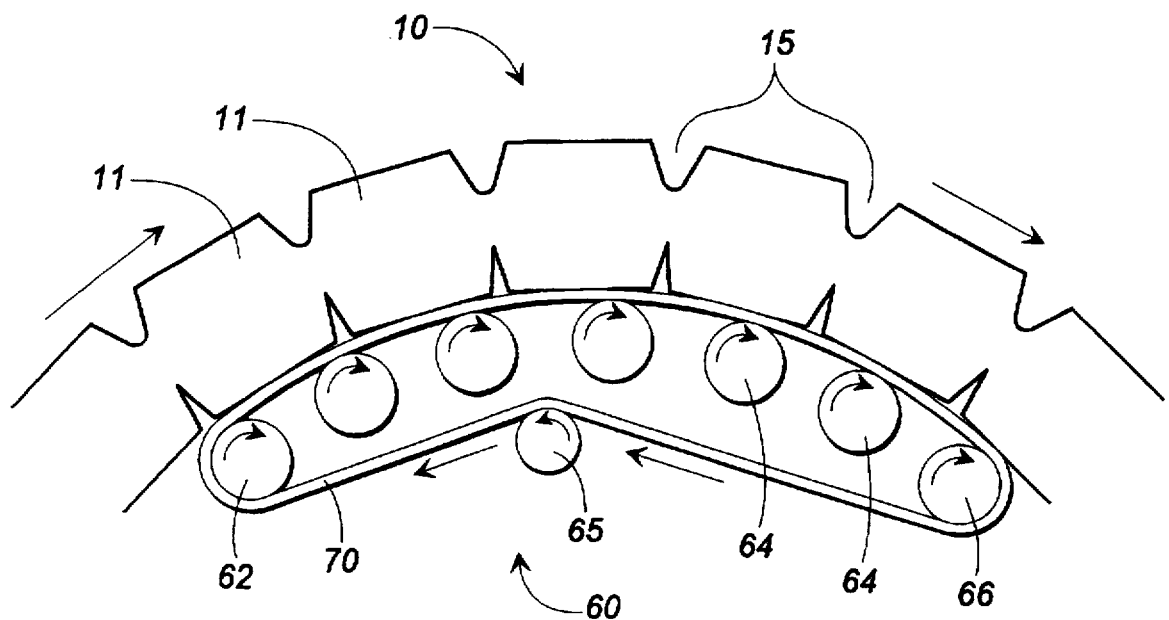
FIG. 10 is a top plan view of an edge drive assembly 60 according to the present invention, in edge engagement with a portion of a conveyor according to the present invention.

The Edge Driving Belt (FIGS. 8–10)

As noted above, gripping and urging of the notched sides of the conveyor may be provided by edge drive pulleys 30 as discussed above, or alternately by use of a continuous edge driving cogged belt 70, shown in FIGS. 8–10.

FIG. 8 illustrates an isolated cut-away section of a cogged belt 70. The cogged belt 70 includes a cogged portion 72 and a channel portion 76. The cogged portion 72 and channel portion 76 are joined together in a laminated fashion. The cogged portion 72 is composed of conventional polyester belt material in the preferred embodiment, and the channel portion 76 is composed of urethane.

The channel portion 76 is configured to matingly engage built-up edge segments 78 (See FIG. 9), which are attached to the belt edge of the conveyor segments 11. In the preferred embodiment, the discrete built-up edge segments 78 are composed of urethane.

Reference is now made to FIG. 10, which illustrates the use of a plurality of pulleys to drive an endless cogged belt 70. The cogged belt 70 is driven by a cogged belt drive pulley 66, and idler pulleys 64 situated on the inside edge of the cogged belt path maintain the cogged belt in its appropriate path. A tail pulley 62 and retainer pulley 65 are likewise shown in contact with the belt 70.

The pulleys 62, 64, 65, and 66 are oriented such that their rotational axes are all substantially vertical, such that the endless cogged belt 70 lies in a plane which is substantially parallel to the plane of the conveyor supporting surfaces. The drive pulley 66, the idler pulleys 64, and the tail pulley 62 lie, in the view shown in FIG. 10, along a generally curved path adjacent to the side of the path of the package conveying segments generally noted as 11.

As noted above, the endless channel 76c defined by the endless channeled portion 76 of the endless cogged belt is configured to matingly accept a plurality of built-up edge segments 78 attached to a corresponding plurality of package conveying segments 11. In the configuration shown in FIGS. 8 and 9, the channels 76C are defined by three wall surfaces, a central wall surface, and two outwardly tapering wall surfaces. These three surfaces are configured to frictionally engage a corresponding three surfaces located along the marginal outside edge of the built-up edge segment 78. This frictional engagement is sufficient to cause conveyor segments such as 11 to be moved along their path, upon the driving of the cogged belt 70 by, for example, the drive pulley 62.

As noted above, the endless cogged belt 70 is configured to engage and drive more than one package conveying segment 11 at one time. In the configuration shown in FIG. 10, the endless belt 70 engages at least five (5) separate built-up edges of five (5) package conveying segments 11. In the configuration shown in FIG. 10, it may also be noted that the "inside" notches discussed above are not completely closed. However, the belt 70 tends to "bridge" these notches.

It should be understood that the endless cogged belt does not have to be on the inside of the conveyor path curve as shown in FIG. 10. Instead the belt 70 could be adjacent to the conveyor segments 11 while they travel on a straight path segment, or the belt 70 could even be on the outside of the curve.

It should also be noted that it is also contemplated under the present invention that the endless cogged belt be in direct contact with the side edge of a conveyor belt, that is, no builtup edge would be used.

Figure 3:
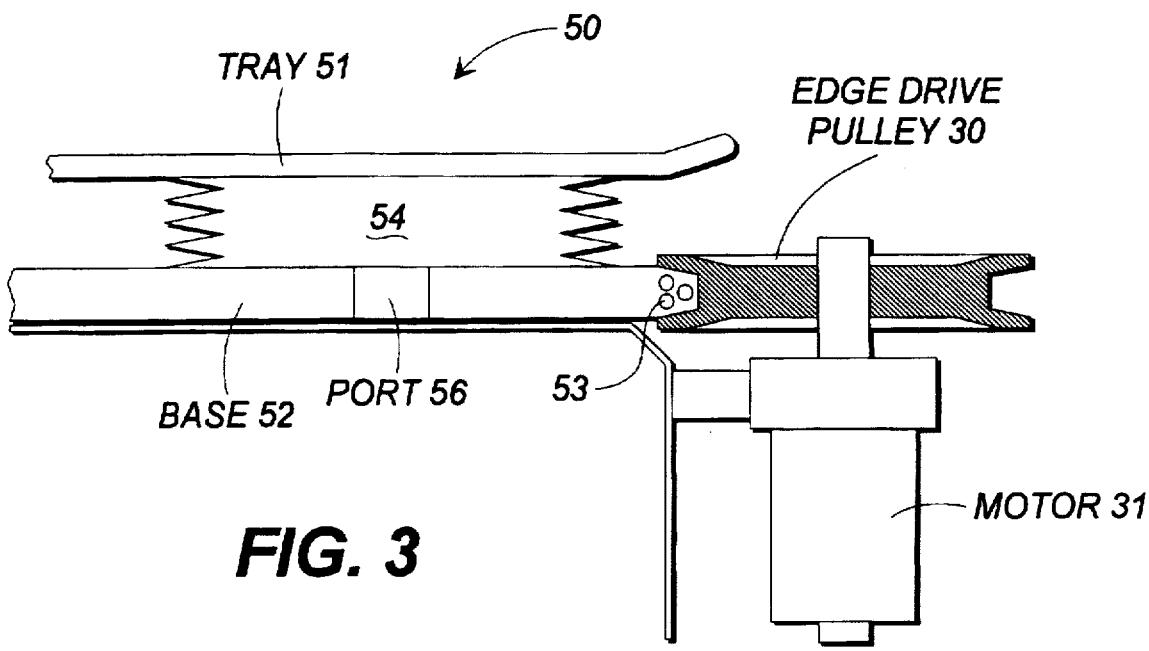
FIG. 3 is a side partial cut away view illustrating the interaction of an edge drive pulley with the reinforced edge of a base of a "tilt tray" package conveying segment.

Vertical Bellows (FIG. 3, 6–7)

As noted above, the package conveying segments generally denoted as 11 of the serpentine conveyor system 10 can take different particular configurations. One such configuration is shown in FIGS. 3–7. These figures show a tilt tray package conveying segment 50 including tiltable trays such as 51 supported by vertical bellows members 54, which can be used such that a package placed stop the tray slides off at least partly under the influence of gravity upon tilting of the tray by the bellows. The conveyor segment base 52 (which in one preferred embodiment is of conventional flexible conveyor belt material) defines bellows ports 56, which facilitate air passage therethrough to corresponding bellows 54 to cause their inflation as discussed in detail below. Such a port 56 allows for air to pass therethrough, such that air blown through the port under a relatively low pressure facilitates inflation and expansion of its associated bellow member, causing the tray to be moved upwardly. Assuming that only one bellows is inflated, this causes the tray 51 to tilt, thus allowing for sliding movement of a package from atop the tray 51 (see FIG. 7).

FIGS. 6 and 7 both illustrate similar views, with FIG. 6 illustrating the configuration before inflation of one of the bellows 54, and FIG. 7 illustrating one of the bellows inflated. FIG. 7 illustrates the opening of one of the air valves 24, allowing air to flow into a corresponding one of the two bellows 54. This causes the associated side of the tray 51 to be raised higher than the other side of the tray, causing the package to slide from the inclined tray surface. In the configuration shown in FIG. 7, the package slides off the side having the outer edge restraint 58 described above.

Referring momentarily to FIGS. 4 and 5, the ports 56 which supply the air to their associated bellows may be seen to be tear-shaped. The reason for this is to allow a round port thereunder to supply air at a controlled gradual manner. The "tail" portion of the tear is the first to encounter the round hole thereunder.

Horizontal Bellows (FIGS. 11–19)

Another particular type of package conveying segment generally denoted as 11 in FIG. 1 can be a "push plate" conveying segment shown as 100 in FIGS. 11–19. In this embodiment, two or more horizontally-acting bellows members are attached relative to the top surface of the base 102 of the push plate conveying segment 100, to provide a pushing function to a package situated atop the top surface of the base 102, such that it is pushed off the conveying segment base 102.

Referring now particularly to FIG. 11, the configuration 100 includes a base 102, a chamber housing 103, bellows members 106, and a push plate 104. The air chamber housing 103 of the push plate conveying segment 100 is attached to the upper surface of the base 102, and is configured 90 it fits under the edge restraint 58. The air chamber housing 103 defines an interior air chamber 105 which is supplied air through a chamber inlet port 103 and itself supplies air to two chamber outlet ports 107. Each of the two chamber outlet ports 107 supplies air from the chamber 105 to a corresponding one of the two horizontally-oriented members 106. In one preferred embodiment, the base 102 is composed of flexible conveyor belt material.

Figure 16:
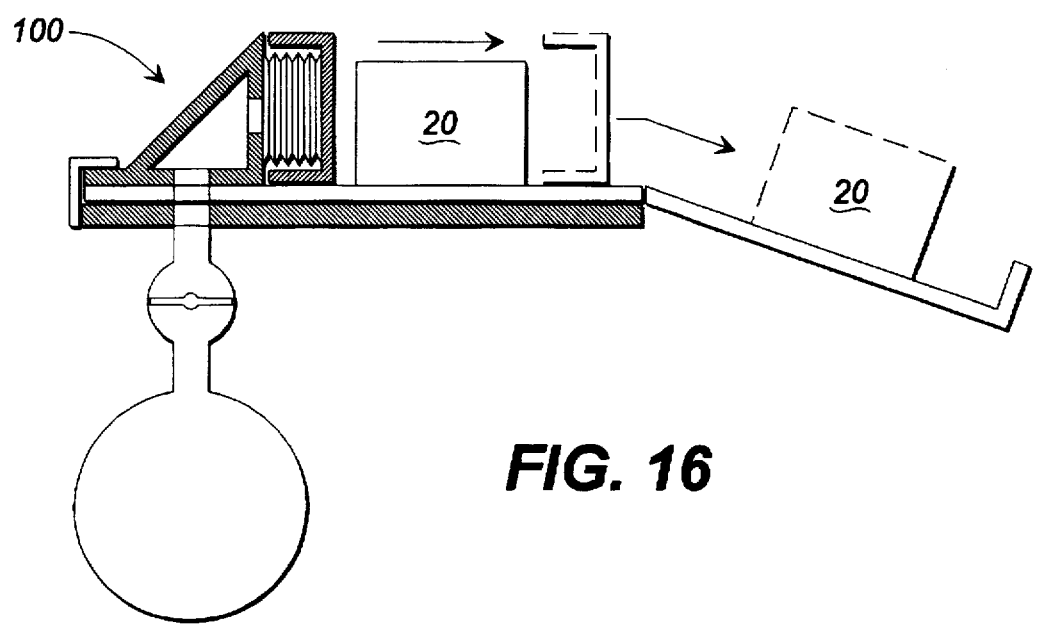
FIG. 16 is a cross sectional view of the configuration shown in FIG. 15, additionally showing an air inlet.

The bellows members 106 operate such that they extend along their lengths upon the introduction or air, such that their two ends are separated along the width of the package conveying segment 100. The bellows members 106 are side-by-side in a parallel relationship, and each has one end attached to the air chamber housing 103 and the other attached to the push plate 204. Upon the energizement of the bellows members 106 from their retracted positions shown in FIGS. 11 and 13 to their extended positions shown in FIGS. 12 and 14, the push plate 104 is itself pushed substantially across the width of the base 102 of the push plate conveying segment 200. Should a package be positioned on the base 102 beside the push plate 102, it is discharged from the base as shown in FIG. 16 by the bellows members 106. Energizement of the bellows member is provided by opening a valve such as 116 from its position shown in FIG. 11 to its position shown in FIG. 12.

Figure 13:
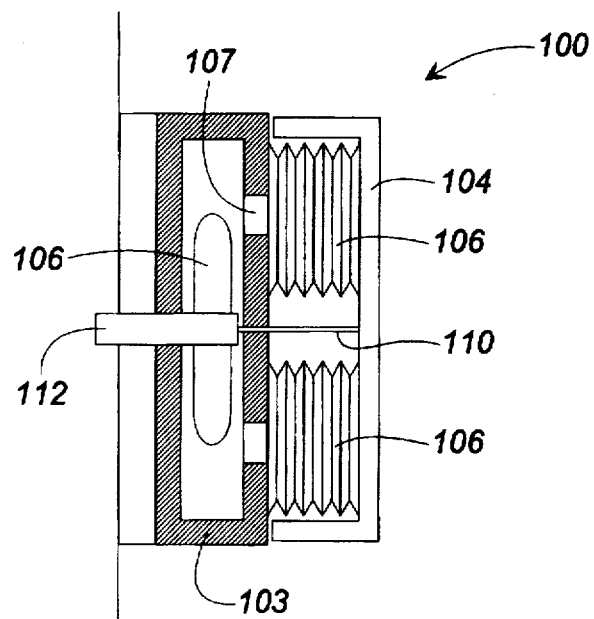
FIG. 13 is a top elevational view of the "push plate" package conveying segment 100 of FIG. 11, shown in its retracted mode.
Figure 14:
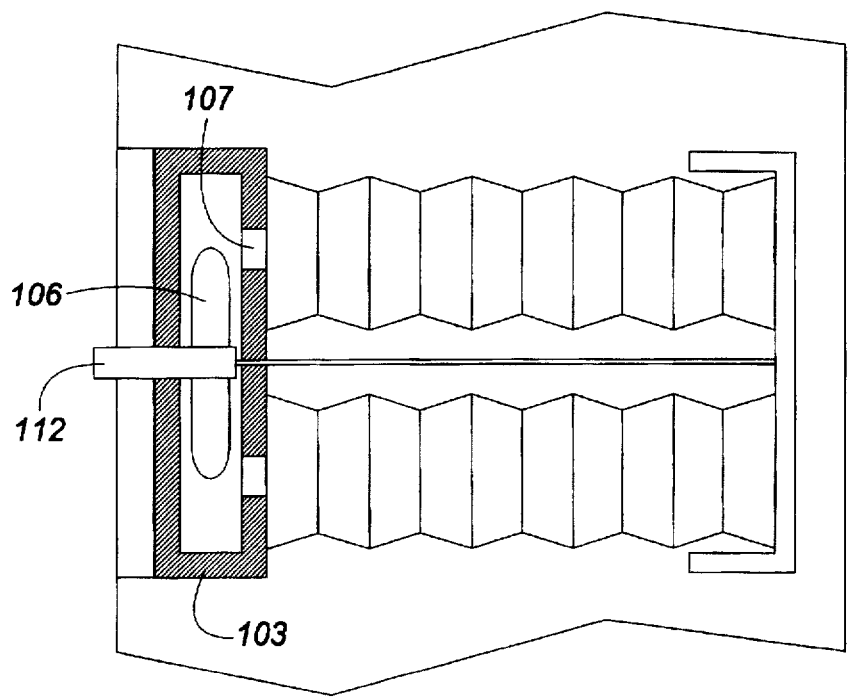
FIG. 14 is a top elevational view of the "push plate" package conveying segment of FIG. 11, shown in its extended mode.

As shown in FIGS. 13 and 14, the conveying segment 200 includes a retracting cable 110, which is extended and contracted from a retracting cable housing 112. The retracting cable housing 112 is attached relative to the air chamber housing 103, and thus the base 102. The retracting cable 110 is mounted within the retracting cable housing 112, such that a tensile force is imparted on the cable 110 such that a pull is everpresent on the push plate which tends to retract it from its extended position of FIGS. 11 and 14 to its retracted position of FIGS. 11 and 13. The force imparted by the retracting cable 110 is sufficient to retract the bellows only when the bellows are not energized.

FIGS. 13 and 14 are top plan views of a configuration 100, illustrating the "dual" feature possible in such a construction. However, it should be understood that one, two, or even more bellows may be used in a particular construction. The port 106 is shown in an elongated configuration in FIGS. 13 and 14, which is to allow air to enter the air chamber 105 over a longer period of time than if the port was simply round as the inlet port 103 is wide.

Figure 15:
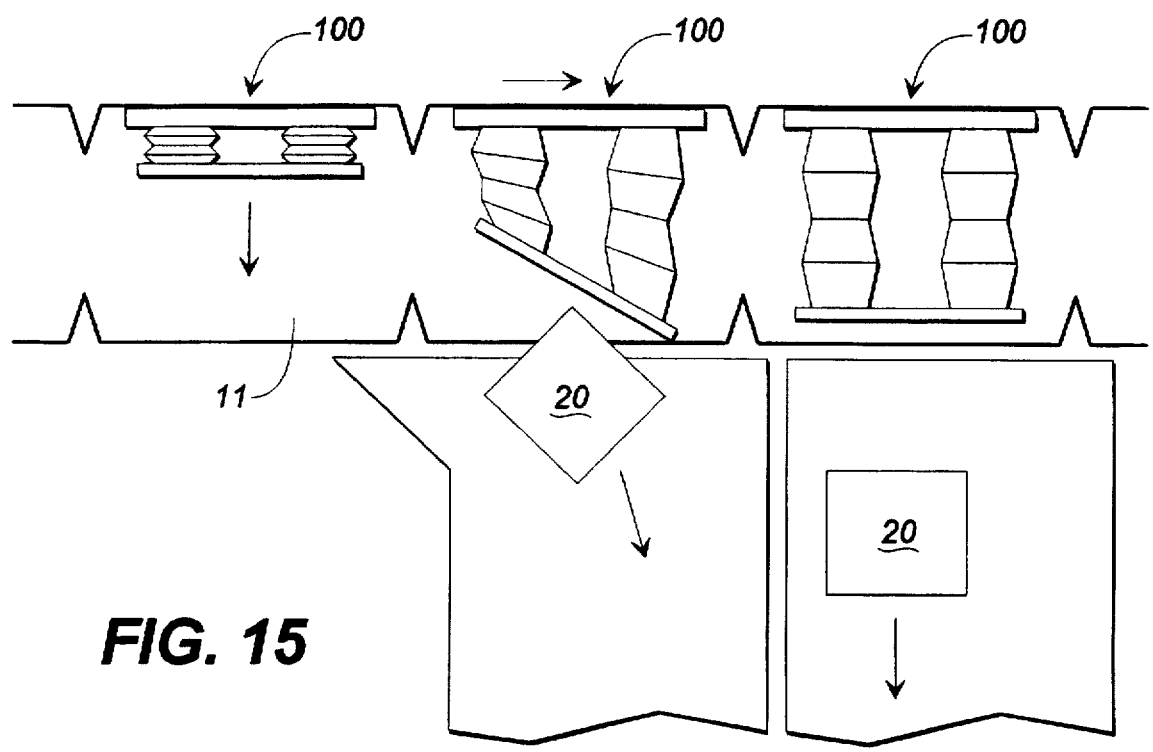
FIG. 15 is a top plan view of an isolated length of a conveyor system according to the present invention, including a "push plate" package conveying segment of FIG. 11, showing different discharge capabilities of a dual-bellows configuration.

FIG. 15 illustrates the capability of the conveyor according to the present invention to initiate either angled or straight, ("square") discharge, by allowing the bellows to extend in a uniform manner, as in the rightmost segment, or in a non uniform manner, at least through a portion of their stroke, as shown in the middle segment. This could be done by controlling air flow as needed.

Figure 17:
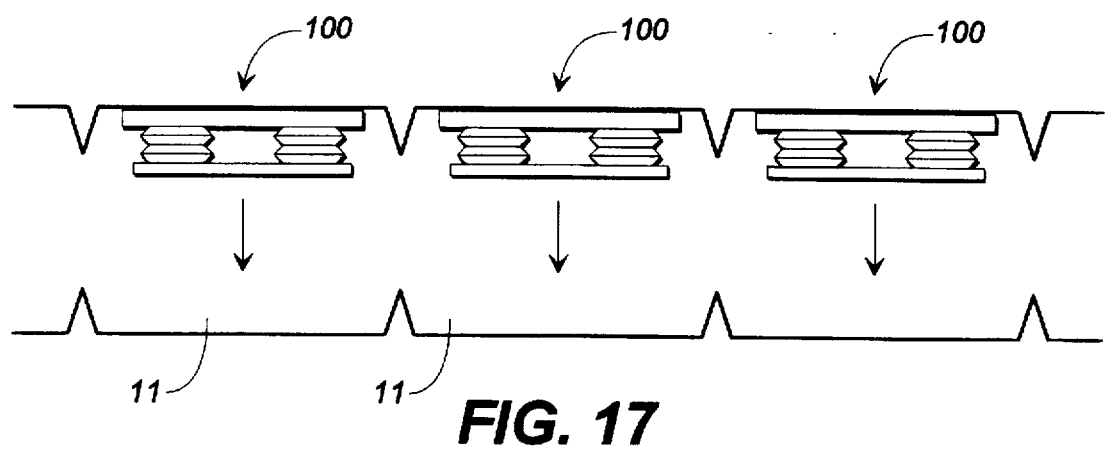
FIG. 17 is a top plan view of a conveyor section including a plurality of pushplate conveying segments attached thereto, such that single side discharge is provided.
Figure 19:
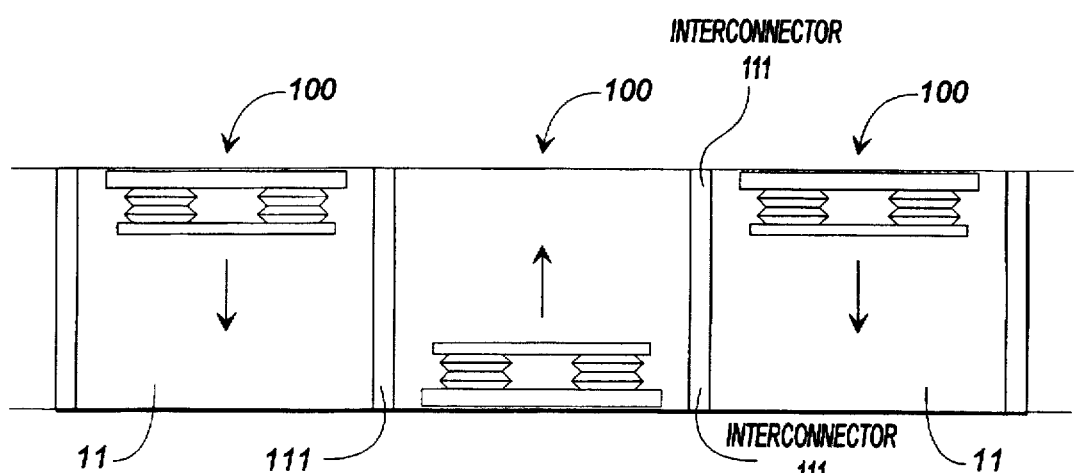
FIG. 19 is a top plan view of a conveyer section including a plurality of push plate package conveying segments attached thereto, such that dual side discharge is provided.

FIG. 17 provides single side discharge of the packages. FIG. 19 shows dual-side discharge of the packages.

Figure 18:
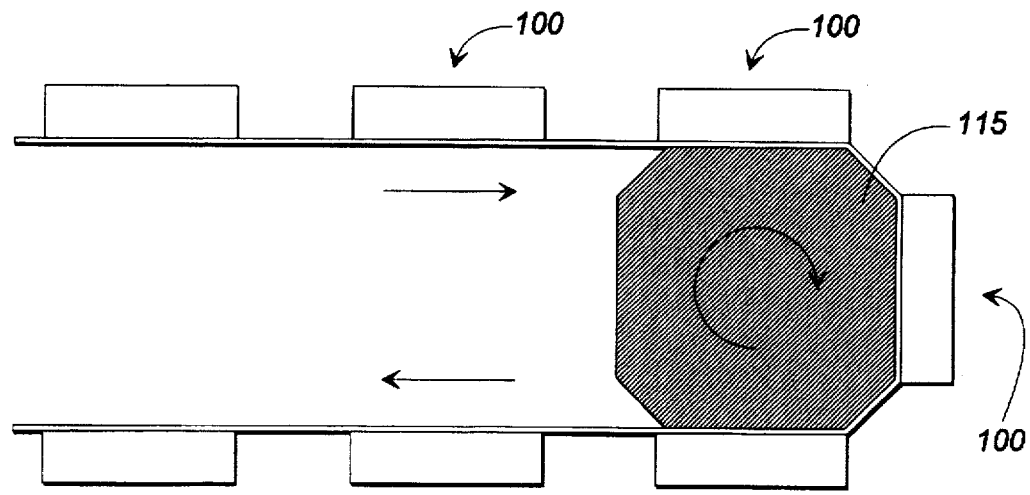
FIG. 18 is a side elevational view of a conveyer system according to the present invention, which includes the use of drum rollers to support the conveyor

As may be understood, the somewhat rigid form of the air chambers which are attached atop the otherwise flexible package conveying segments 11 of FIG. 17 could make "overunder" conveyor setups using cylindrical conveyor drive and idler rollers impractical. Therefore, FIG. 18 shows the use of a hexagonally-shaped drive roller 115, which accommodates such over-under configurations.

As may be understood, such an over/under configuration would not have to use the notches as discussed above, instead a conventional, unnotched, conveyor belt could also be used to support assemblies such as 100 thereon.

FIG. 19 shows an alternate configuration which may be used with the present invention. In this configuration, instead of being supported by what is essentially a notched conventional flexible conveyor belt, solid platforms can be used to support the bellows assemblies and to provide the package supporting surfaces within each package supporting segment 11.

Interconnecting the rigid platforms are flexible interconnectors 11I, which are essentially rubber interconnectors each of which include two opposing male flanges which fit into female "notches" defined in the edge ends of the platforms and link two adjacent platforms together. The interconnectors can also include an elongate tooth running its length, which can be driven by a slot defined by a drive member such as a roller, such that the platforms are isolated from the drive means by the flexible connectors, while still being driven by the drive means through the connectors. This is suitable for an "over-under" configuration as described above.

Alternate Configurations

If so desired, the reinforcement strip 17 could be located underneath the belt instead of atop it as shown in FIG. 6. In such a configuration, a flat supporting surface would not be suitable for supporting the conveyor, but an upwardly-directed slot (not shown) could be provided to accommodate the strip. In fact, such a slot/strip combination could be used to accommodate lateral side forces on the belt.

It should be noted that one of the two ports of FIG. 13 can be a different size, to allow the side of the pusher plate with the smaller hole to "lay" behind the side corresponding to the larger hole. This could also be accomplished by providing an insert to reduce the size of the hole.

It should also be understood that the air chamber 105 could be of a two-part configuration (not shown), with two inlet holes instead of one inlet hole, and two air chambers (corresponding to each bellows) to allow for different selectable dynamic actions of the corresponding bellows.

It should also be understood that the package conveying segments 11 shown in FIG. 1 could have no package discharge capabilities; the segments could simply be bare conveyor belt segments which simply support packages thereon, and rely upon outside means for receipt and discharge.

Construction Materials

As noted above, under one embodiment of the present invention, an endless polyester flexible belt can be used to comprise the conveying segments 11 and the flexible necked portions 14. In fact, under such a configuration the construction could be thought of as a flexible belt which is "6notched" along its longitudinal sides to provide the above-referenced flexing features. While on the subject, it should be noted that the flexible nature of such a belt could result in some flexing within the package conveying segments 11 themselves, although it is contemplated that most of the flexing will be in the location between the notches 15.

The bellows can be made of conventional woven polyester. The air chamber 203 (in FIG. 11 for example) can be composed of plastic, fiberglass, urethane, and can be extruded and capped at its ends.

Conclusion

While this invention has been described in specific detail with reference to the disclosed embodiments, it will be understood that many variations and modifications may be effected within the spirit and scope of the invention as described in the appended claims.

I claim:

1. A conveying apparatus defining a plurality of conveying surfaces configured for conveying items, said conveying surfaces following a path, said path being variably curved and lying within a horizontal plane, said conveying apparatus comprising:

a supporting member defining an upwardly-directed horizontal, substantially planar, supporting surface;

a plurality of conveying segments each defining one of said conveying surfaces, each of said conveying segments defining a substantially planar downwardly-directed undersurface slidably supported atop said planar support surface;

a driving member for driving said conveyor segments along said variably curved path such that said conveyor segments pivot sidewardly relative to each other while traveling along said variably curved path; and a plurality of flexible neck portions interconnecting said conveyor segments while accommodating said sideward pivoting, said neck portions likewise each defining a corresponding planar portion configured to be slidably supported by said planar supporting surface.

2. The conveying apparatus as claimed in claim 1, wherein said necked portion includes rubber.

3. The conveying apparatus as claimed in claim 2, wherein said rubber of said necked portion includes additional reinforcement therein.

4. The conveying apparatus as claimed in claim 3, wherein said additional reinforcement includes steel wires embedded therein.

5. The conveying apparatus as claimed in claim 3, wherein said additional reinforcement includes KEVLAR embedded therein.

6. The apparatus as claimed in claim 1, wherein one of said conveying segments includes an ejection member traveling with said conveying segment for ejecting an item placed thereon.

7. The apparatus as claimed in claim 6, wherein said ejection member includes a horizontally-oriented air-receiving bellows attached to a pushing member defining a substantially vertical pushing surface, for pushing an item off said conveying segment.

8. The apparatus as claimed in claim 1, wherein one of said conveying segments includes a tilting tray supported by a pair of vertical air bellows configured to tilt said tray to allow an item placed thereon to slide therefrom.

9. A conveying apparatus defining a plurality of upwardly-directed conveying surfaces configured for conveying items, said conveying surfaces following a path, said path being variably curved and lying within a horizontal plane, said conveying apparatus comprising:

a supporting member defining an upwardly-directed horizontal substantially planar, supporting surface;

a substantially continuous elongate flexible belt portion having a substantially planar downwardly-directed undersurface slidably supported atop said planar support surface, a length and a nominal width, said belt portion itself comprised of the following components "a" and "b":

a) a plurality of conveyor segments each defining one of said conveying surfaces and having a width being the width of said flexible belt portion, said width being defined by two opposing discrete side edges; and b) a corresponding plurality of intermediate flexible necked portions intermediate and connecting each of said plurality of conveyor segments, said intermediate necked portions each defining two opposing side notches which reduce the width of said necked portions to accommodate side flexing of said necked portions conveyor segments relative to each other; and said conveyor apparatus finally comprising means for driving said conveyor segments along said variably curved path such that said conveyor segments pivot sidewardly relative to each other while traveling along said variably curved path due to said side flexing of said necked portions.

10. The conveying apparatus as claimed in claim 9, wherein said necked portion includes additional reinforcement therein.

11. The apparatus as claimed in claim 9, wherein one of said conveying segments includes an ejection member traveling with said conveying segment for ejecting an item placed thereon.

12. The apparatus as claimed in claim 11, wherein said ejection member includes a horizontally-oriented air-receiving bellows attached to a pushing member defining a substantially vertical pushing surface, for pushing an item off said conveying segment.

13. The conveying apparatus as claimed in claim 12, wherein said necked portion includes additional reinforcement therein.

14. The apparatus as claimed in claim 9, wherein one of said conveying segments includes a tilting tray supported by a pair of vertical air bellows configured to tilt said tray to allow an item placed thereon to slide therefrom.

15. A conveying apparatus defining a plurality of conveying surfaces configured for conveying items, said conveying surfaces following a path being variably curved but lying within a horizontal plane, said conveying apparatus comprising:

a supporting member defining an upwardly-directed horizontal, substantially planar, supporting surface;

a plurality of conveyor segments each defining one of said conveying surfaces such that a substantially continuous, planar, supporting surface is provided by each of said plurality of conveyor segments, each of said conveyor segments defining opposing discrete side edges, and each of said conveyor segments having a substantially planar, downwardly-directed undersurface;

a plurality of flexible necked portions intermediate and connecting each of said plurality of conveyor segments, said intermediate necked portions each defining two opposing side notches which reduce the width of said necked portions to accommodate side flexing of said necked portions conveyor segments relative to each other such that said side notches open and close with said flexing; and edge segment drive means for driving said conveyor along said path by contacting said discrete side edges, such that said segmented conveyor is driven along said curved path at least partially under the power of said edge drive means.

16. The conveying apparatus as claimed in claim 15, wherein said edge segment drive means is located at a location where said side notches are closed more than they would be if said path was straight.

17. The conveying apparatus as claimed in claim 16, wherein said drive means contacts said edge segments at a point along their path where said edge segments are substantially abutting due to the closing of their intermediate gaps due to bending of said belt.

18. The conveying apparatus as claimed in claim 17, wherein said edge segments are reinforced.

19. The conveying apparatus as claimed in claim 15, wherein said edge segment drive means is provided by at least one drive pulley for engaging and driving said edge segments.

20. The conveying apparatus as claimed in claim 15, wherein said edge segment drive means is provided by an endless belt for engaging and driving said side edge segments.

21. The conveying apparatus as claimed in claim 20, wherein said continuous drive belt defines an endless channel configured to accept and drive said conveying segment edges.

22. The conveying apparatus as claimed in claim 21, wherein said channel is an outwardly tapering channel.

23. The conveying apparatus as claimed in claim 15, wherein one of said conveying segments includes an ejection member traveling with said conveying segment for ejecting an item placed thereon.

24. The apparatus as claimed in claim 23, wherein said ejection member includes a horizontally-oriented air-receiving bellows attached to a pushing member defining a substantially vertical pushing surface, for pushing an item off said conveying segment.

25. The apparatus as claimed in claim 15, wherein said conveying segment includes a tilting tray supported by a pair of vertical air bellows configured to tilt said tray to allow an item placed thereon to slide therefrom.

26. The conveying apparatus as claimed in claim 15, wherein said conveyor segments and said flexible necked portion are formed with a unitary length of flexible conveyor belting with said notches therein.

* * * * *

UNITED STATES PATENT AND TRADEMARK OFFICE
CERTIFICATE OF CORRECTION

PATENT NO.    : 5,894,918
DATED         : April 20, 1999
INVENTOR(S)   : Bonnet

It is certified that error appears in the above-identified patent and that said Letters Patent is hereby corrected as shown below:

Column 11,
Line 24, after said, please delete "necked".
Line 25, delete "portions".

Column 12,
Line 10, delete "neck portions".

Signed and Sealed this

Ninth Day of July, 2002

Attest:

Attesting Officer

JAMES E. ROGAN
Director of the United States Patent and Trademark Office